(12) United States Patent
McDaniel et al.

(10) Patent No.: US 8,490,130 B2
(45) Date of Patent: Jul. 16, 2013

(54) TELEVISION CHANNEL LIST SYSTEM AND METHOD

(75) Inventors: James T. McDaniel, Beaufort, SC (US); Henry M. Forson, Nashville, TN (US)

(73) Assignee: Kabushiki Kaisha Toshiba, Tokyo (JP)

( * ) Notice: Subject to any disclaimer, the term of this patent is extended or adjusted under 35 U.S.C. 154(b) by 411 days.

(21) Appl. No.: 12/318,756

(22) Filed: Jan. 7, 2009

(65) Prior Publication Data

US 2009/0204998 A1 Aug. 13, 2009

Related U.S. Application Data

(60) Provisional application No. 61/006,340, filed on Jan. 7, 2008.

(51) Int. Cl.
*H04N 5/445* (2011.01)
(52) U.S. Cl.
USPC .............................................. 725/38; 725/37

(58) Field of Classification Search
USPC ........................................................... 725/38
See application file for complete search history.

(56) References Cited

U.S. PATENT DOCUMENTS

| | | | |
|---|---|---|---|
| 6,125,259 A * | 9/2000 | Perlman | 725/28 |
| 6,600,522 B1 | 7/2003 | Kim | |
| 6,741,288 B1 | 5/2004 | Kessler | |
| 6,924,848 B2 | 8/2005 | Onomatsu | |
| 6,985,190 B1 * | 1/2006 | Klopfenstein et al. | 348/569 |
| 2002/0097344 A1 | 7/2002 | Shibusawa | |
| 2003/0051247 A1 | 3/2003 | Klopfenstein | |
| 2004/0036811 A1 | 2/2004 | Ikeguchi | |

* cited by examiner

*Primary Examiner* — Nicholas Corbo
(74) *Attorney, Agent, or Firm* — Nixon & Vanderhye P.C.

(57) ABSTRACT

Example systems and methods of generating a television channel list involve scanning virtual channels contained in a transport stream supplied to a television and determining, for each scanned virtual channel, whether that channel contains decodable video or audio content. A ring list used for tuning channels in channel up/down tuning operations is generated which contains only those scanned channels determined to have decodable video or audio content.

6 Claims, 3 Drawing Sheets

TELEVISION CHANNEL LIST SYSTEM AND METHOD

CROSS-REFERENCE TO RELATED APPLICATION

This application claims the benefit of provisional U.S. application No. 61/006,340, filed Jan. 7, 2008, the contents of which are incorporated herein in their entirety.

BACKGROUND AND SUMMARY

The subject application generally relates to systems and methods for generating a channel list for a television.

In the United States, cable systems typically broadcast some digital channels "in-the-clear" and some encrypted. The encryption is used to enforce subscription to variously-priced channel packages such as, for example, via a smart-card-based conditional access mechanism, known as a CableCard. When the number of encrypted channels is sufficiently greater than the number of "in-the-clear" channels, it can be difficult for a user to find the in-the-clear channels, especially if tuning takes several seconds and there is no obvious pattern to the mix of encrypted and unencrypted channels. For instance, in an example cable system, there may be one hundred (100) digital "in-the-clear" channels, of which about half may be audio only, and over 200 digital channels that are encrypted or otherwise not viewable without a conditional access mechanism. If a user were to randomly change to a digital channel, or use the channel-up or channel-down keys to navigate to the next digital channel after scanning, the odds are better than 2:1 that the user would be left on an unwatchable channel. Furthermore, cable companies can and do change their digital channel lineups at will, in a manner that is transparent to those with CableCards or cable boxes, but aggravating to customers dependent on remembering or configuring a ring list for "in-the-clear" channels.

The systems and methods described herein remove digital channels from the ring list during a scan, if the channel does not have decodable audio or video. Consequently, the user has a much greater chance of finding "in-the-clear" channels when using channel-up or channel-down to navigate through the digital channels. The systems and methods also makes it much easier for a user without a conditional access mechanism to cope with the digital channel reassignments that are done by cable companies.

Example systems and methods of generating a television channel list described herein involve scanning virtual channels contained in a transport stream supplied to a television and determining, for each scanned virtual channel, whether that channel contains decodable video or audio content. A ring list used for tuning channels in channel up/down tuning operations is generated which contains only those scanned channels determined to have decodable video or audio content.

DETAILED DESCRIPTION OF EXAMPLE EMBODIMENTS

Figure 1:
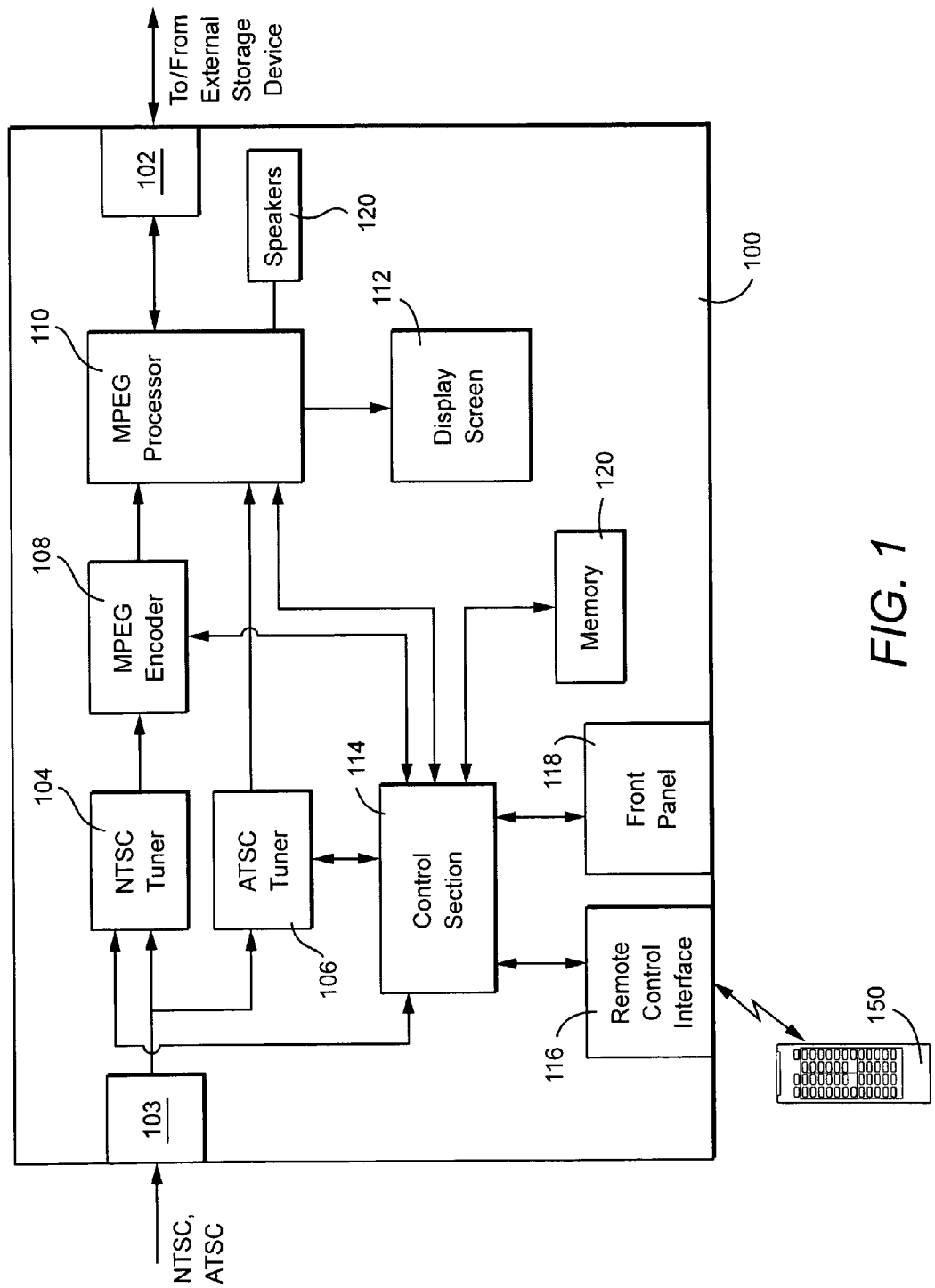
FIG. 1 is a highly generalized block diagram of an example television 100 in which the example systems and methods described herein may be implemented.

FIG. 1 is a highly generalized block diagram of a television 100 in which the example systems and methods described herein may be implemented. The details of television 100 are provided by way of example only and it will be readily apparent that the systems and methods described herein may be implemented in a wide variety of televisions of different configurations, both analog and digital.

An input 103 of the television receives NTSC and ATSC signals. The NTSC signals are supplied to an NTSC tuner 104 and the ATSC signals are supplied to an ATSC tuner 106. Other inputs (not shown) may also be supplied to the television. For example, the television may receive HDMI signals or the output from a DVD player. The output of NTSC tuner 104 is supplied to an MPEG encoder 108 which MPEG encodes the tuned NTSC signal. The outputs of ATSC tuner 106 and MPEG encoder 108 are supplied to an MPEG AV processor 110. MPEG AV processor 110 processes the MPEG transport stream from the ATSC tuner 106 and/or MPEG encoder 108 and supplies a display signal to display screen 112 and a sound signal to speakers 120. MPEG AV processor 110 also selectively outputs an MPEG transport stream to and receives an MPEG transport stream from an external storage system via interface 102. The external storage system may, for example, include a hard disk drive (HDD) recording device, a DVD recording device, or an HDD/DVD recording device. Generally speaking, MPEG AV processor 110 is a standard processing device used in conventional digital integrated televisions, monitors and set-top box (STB) units that receives MPEG compressed AV data and decompresses and processes the AV data for output via display screen 112 and speakers 120.

A control section 114, including a CPU, for example, controls the overall operations of television 100. In general, control section 114 may include, for example, a microprocessor, a microcontroller, a processor, a controller, an application specific integrated circuit (ASIC), logic circuitry, a state machine and/or combinations thereof. Control section 114 may be supplied with inputs from a user via a remote control interface 116 (e.g., a wireless infrared receiver) for a remote control 150 (e.g., an infrared remote control) and front panel keys 118. MPEG AV processor 110 may selectively block output of audio and/or video in accordance with control signals from control section 114.

Memory 120, which may be a combination of volatile and non-volatile semiconductor memory, stores various operating programs and user settings (e.g., rating level(s) set by parents) used by control section 114 to control the operation of television 100. For example, memory 120 may include ROM storing an operating program for execution by the control section 114 to implement the systems and methods described herein. This operating program may provide for control of tuners 104, 106; control of MPEG AV processor 110 to generate displays for display on display screen 212 and sounds for output via speakers 120; processing of inputs supplied by a user via front panel 118 and/or remote control 150; and the like. Memory 120 may also include SDRAM for use by control section 114 during execution of the operating program.

Television 100 may also be provided with an electronic program guide. Generally speaking, an electronic program guide uses program guide data transmitted to the television to provide the user with on-screen displays of television program schedules. For example, the on-screen display may be in the form of a grid in which channels are arranged vertically and time extends horizontally. Titles of programs are shown in cells in the grid and the horizontal dimension of the cell is indicative of the length of the corresponding program. The electronic program guide may also enable a user to select programs from the grid (or from some other display of program titles) for viewing and recording. In the case of selecting a program from the program guide for viewing, the television is controlled to tune to the channel showing the selected program. In the case of selecting a program for future recording, a program timer is generated with relevant recording information (e.g., start time, end time, channel). At the program start time, the television is controlled to tune to the selected channel and command(s) may be issued to turn on and place a recording device in record mode (e.g., to the external storage device via interface 102). At the program end time, command(s) may be issued to stop the record mode and turn off the recording device. In addition, electronic program guides also often provide the capability of displaying listings of programs by themes and titles. Electronic program guides are available from various providers including Gemstar-TV Guide.

Figure 2:
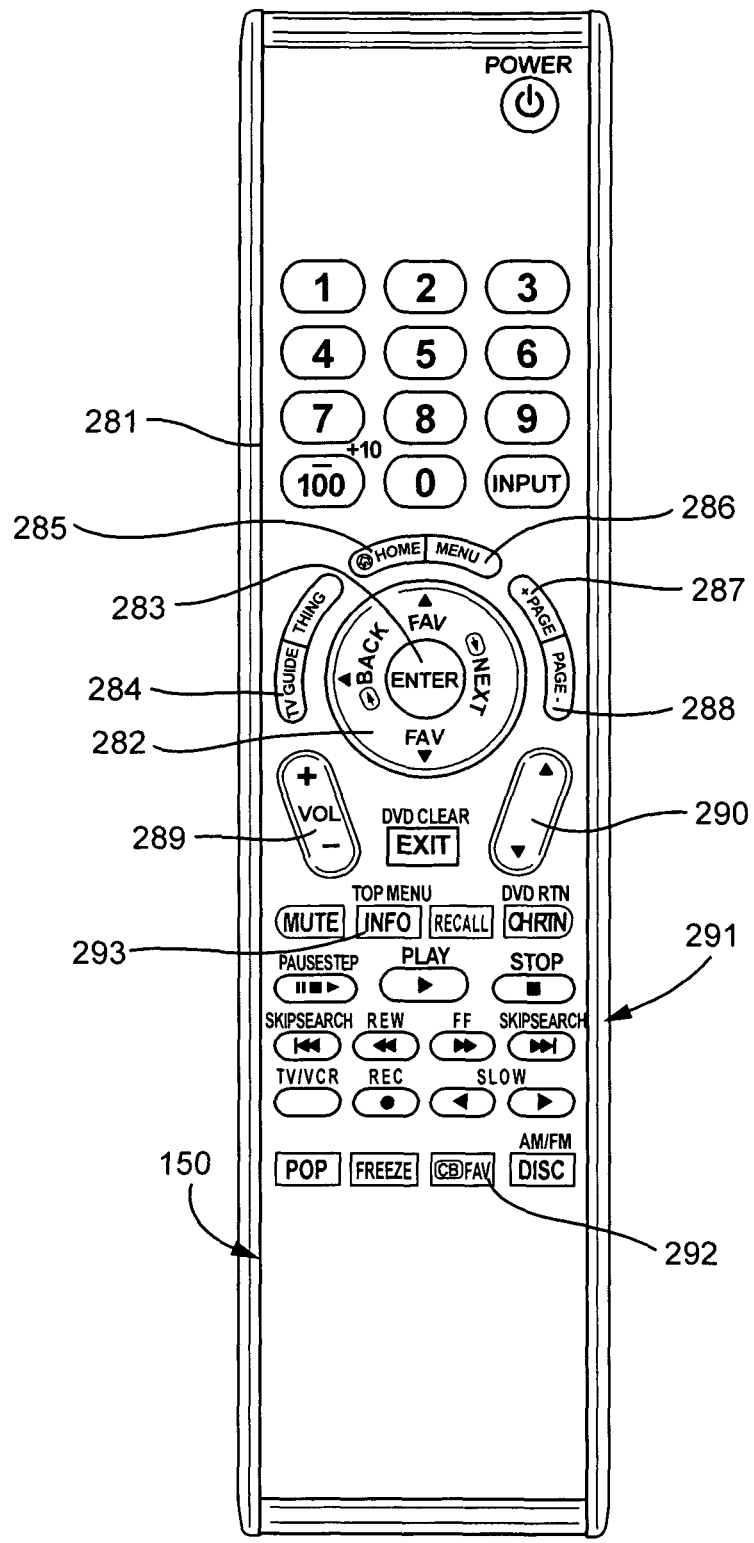
FIG. 2 provides a more detailed view of example remote control 150 in FIG. 1.

FIG. 2 shows an example layout of keys and buttons for remote control 150. The keys or buttons of remote control 150 may be appropriately labeled to assist the user in selecting a desired function. Alternatively or additionally, television 100 may provide one or more displays that inform the user which key(s) or button(s) should be actuated to input desired commands. Other types of inputs such as voice inputs may also be used to input commands in certain implementations.

Remote control 150 includes a numeric keypad 281 including the numbers 0-9. Keypad 281 also includes a "–/100" key for use in entering channel numbers greater than 100 and a delimiter for separating major and minor channel numbers (e.g., channel 125-3). An "Input" key is provided for use in switching between different inputs to television 100 (e.g., different antennas, different video inputs, different devices connected to the television, etc.). Remote control 150 also includes a navigation switch 282 that provides for up, down, left and right navigation through menus, program guides, and the like. An enter key 283 is also provided. Various keys are provided around part of the periphery of navigation switch 282. A "program guide" key 284 causes a program guide to be displayed. A "home" key 285 causes television 200 to tune to a HOME channel. A "menu" key 286 causes television 200 to display an initial menu screen for accessing various features of television 200. A "Page+" key 287 and a "Page–" key 288 provide for navigation through menus, program guides, etc. A volume up/down key 289 and a channel up/down key 290 permit the user to set the volume level and to select television channels. A DVD/VCR keypad 291 allows the user to control a DVD player and/or a VCR. A "Fav" key 292 accesses a favorite channel feature. An "Info" key 293 can be pressed by a user to access additional information on a particular topic.

It will of course be appreciated that the function(s) associated with the various keys and buttons of the remote controls described above may vary depending on the state of television 100 (e.g., watching television, moving through menus, making menu selections, etc.). Moreover, the layout of the keys and buttons shown in FIG. 2 is not intended to be limiting in any way and various designs for laying out these keys and buttons may be adopted.

The systems and methods described herein remove digital channels from a ring list for channel tuning during a channel scan, if the channel does not have decodable audio or video. Consequently, the user has a much greater chance of finding "in-the-clear" channels when using channel-up or channel-down to navigate through the digital channels. The systems and methods also makes it much easier for a user without a conditional access mechanism to cope with the digital channel reassignments that are done by cable companies.

The television may, for example, "scan" ATSC signals supplied to input 103 to find which channels are present. Found channels are added to a "ring" list, which is a doubly-linked list of channels arranged in sequential order, so that when using channel-up or channel-down keys, the next channel above or below the present channel may be efficiently found. The scanning may be invoked via an on-screen menu selection or by pressing a particular key (or keys) on a remote control.

Figure 3:
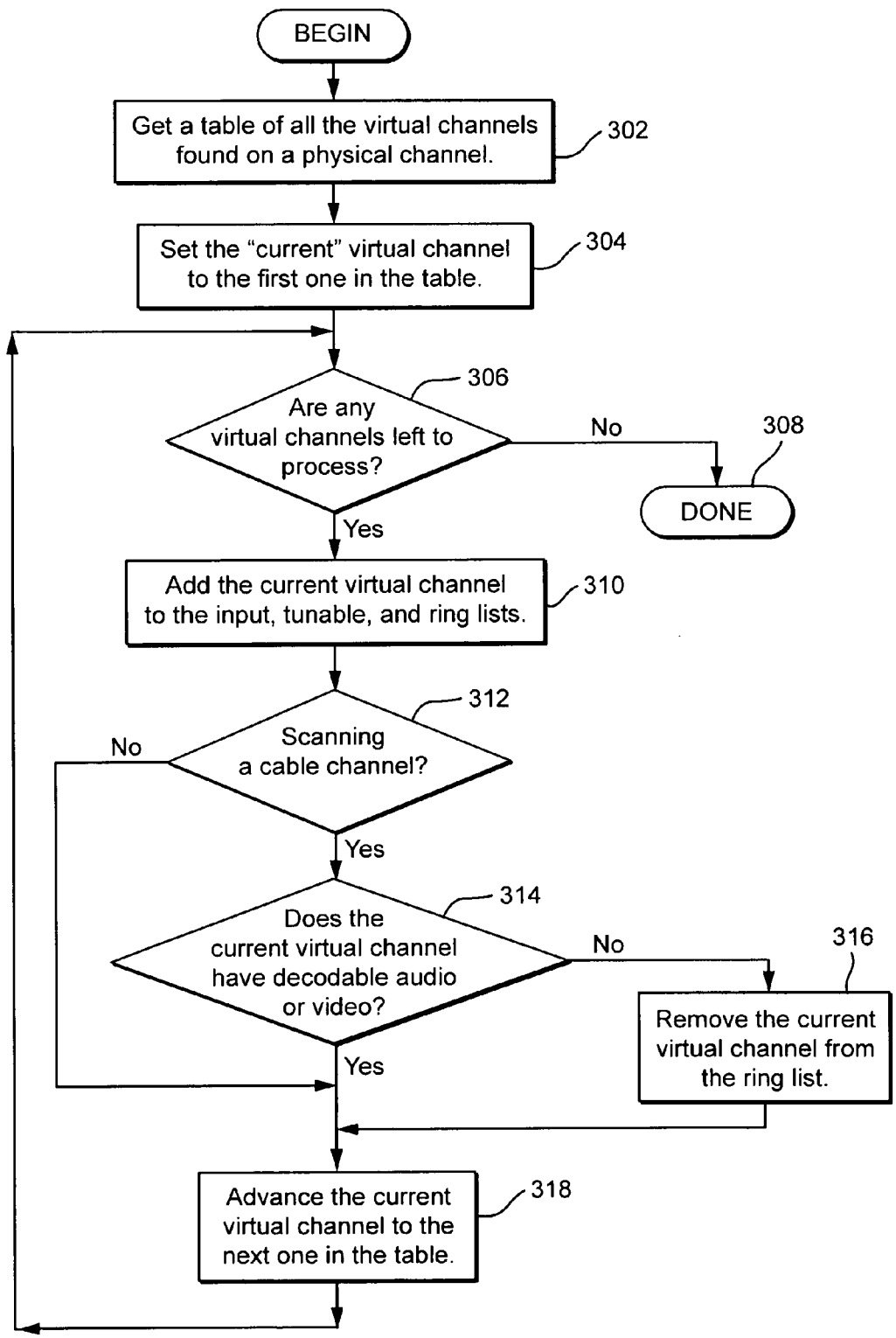
FIG. 3 is a flow chart of an example method for generating a channel list.

As shown in FIG. 3, the systems and methods described herein involve attempting to briefly tune to each "virtual" channel that is discovered during a scan and removing from the ring list those channels that do not have decodable audio or video (e.g., those channels for which MPEG AV processor 110 cannot lock onto bitstreams).

As described in the ATSC A/65C standard (more specifically, ATSC Standard: Program and System Information Protocol for Terrestrial Broadcast and Cable (Revision C); With Amendment No. 1-2 Jan. 2006; Amendment No. 1 dated 9 May 2006, the contents of which are incorporated herein in their entirety), a virtual channel is a designation, usually a number, that is recognized by a user as the single entity that will provide access to an analog TV program or a set of one or more digital elementary streams. It is called "virtual" because its identification (name and number) may be defined independently from its physical location. Examples of virtual channels are: digital radio (audio only), a typical analog TV channel, a typical digital TV channel (composed of one audio and one video stream), multi-visual digital channels (composed of several video streams and one or more audio tracks), or a data broadcast channel (composed of one or more data streams).

At ST 302, a table of all the virtual channels found on a physical channel is obtained (e.g., from information in the transport stream). For example, the above-mentioned ATSC A/65C standard provides for a virtual channel table (VCT) that contains a list of the channels available in the transport stream which is supplied to television 100 via input 103. At ST 304, the "current" virtual channel is set to the first channel in the table. At ST 306, a determination is made as to whether there are any virtual channels in the table remaining to be processed. If no channel remain to be processed, the process ends at ST 308.

If there are channels remaining to be processed, the process proceeds to ST 310 where the current virtual channel is added to the input, tunable and ring lists. At ST 312, a determination is made as to whether the scanned channel is a cable channel. If not, the process proceeds to ST 318. If the scanned channel is a cable channel, a determination is made at ST 314 as to whether the current virtual channel has decodable audio or video. As mentioned above, this determination may be based on, for example, whether decoding processes in MPEG AV processor 110 can lock onto a bitstream for the current virtual channel. If the channel has decodable audio or video, the process proceeds to ST 318. If not, the current virtual channel is deleted from the ring list at ST 316 and the process then proceeds to ST 318.

At ST 318, the current virtual channel is advanced to the next channel in the table and the process returns to the determination at ST 306.

The systems and methods described herein remove digital channels from the ring list during a scan, if the channel does not have decodable audio or video. Consequently, the user has a much greater chance of finding "in-the-clear" channels when using channel-up or channel-down to navigate through the digital channels using the ring list. The systems and methods also make it much easier for a user without a conditional access mechanism to cope with the digital channel reassignments that are done by cable companies.

The various aspects of the systems and methods described herein may be implemented as part of an operating program executed by control section 114. This program can, for example, be tangibly embodied or stored on a computer-readable medium such as memory 120. Memory 120 may include magnetic memory, optical memory, semiconductor memory, magneto-optic memory, combinations thereof and the like and may in some instances be removable memory, such as removable memory card. In another example, the program may be available for downloading over the internet so that the program may be delivered to television 100 via a communication network. Updates may be provided via downloads to television 100. Further, a carrier wave may be modulated by a signal representing the corresponding program and an obtained modulated wave may be transmitted, so that the television that receives the modulated wave may demodulate the modulated wave to restore the corresponding program.

While the systems and methods have been described in connection with what is presently considered to practical and preferred embodiments, it is to be understood that these systems and methods are not limited to the disclosed embodiments, but on the contrary, is intended to cover various modifications and equivalent arrangements included within the spirit and scope of the appended claims.

We claim:

1. A method of generating a television channel list, comprising:
    scanning virtual channels contained in a transport stream supplied to a television;
    adding said scanned virtual channels to a ring list;
    determining whether or not a scanned virtual channel in the ring list is a cable channel;
    determining, for each scanned virtual channel, which is a cable channel, whether that channel contains encrypted video or audio content;
    wherein those scanned channels determined not to have encrypted video or audio content are kept in the ring list and those scanned channels determined to have encrypted video or audio content are removed from the ring list; and
    generating a ring list used for tuning channels in channel up/down tuning operations,
    wherein the inclusion of a scanned channel in the ring list is based exclusively on whether the scanned signal contains encrypted video or audio content.

2. The method according to claim 1, wherein
    the ring list is generated by adding a currently scanned virtual channel to the ring list and then subsequently deleting that channel from the ring list if the channel is determined to have encrypted video or audio content.

3. A television comprising:
    an input receiving a transport stream; and
    a processing system programmed to scan scanning virtual channels contained in the transport stream, add said scanned virtual channels to a ring list, determine whether or not a scanned virtual channel in the ring list is a cable channel, determine, for each scanned virtual channel, which is a cable channel, whether that channel contains encrypted video or audio content,
    wherein those scanned channels determined not to have encrypted video or audio content are kept in the ring list and those scanned channels determined to have encrypted video or audio content are removed from the ring list, and generate a ring list used for tuning channels in channel up/down tuning operations,
    wherein the inclusion of a scanned channel in the ring list is based exclusively on whether the scanned signal contains encrypted video or audio content.

4. The television according to claim 3, wherein
    the ring list is generated by adding a currently scanned virtual channel to the ring list and then subsequently deleting that channel from the ring list if the channel is determined to have encrypted video or audio content.

5. A non-transitory computer-readable medium having stored therein program instructions for a method of generating a television channel list, the method comprising:
    scanning virtual channels contained in a transport stream supplied to a television;
    adding said scanned virtual channels to a ring list;
    determining whether or not a scanned virtual channel in the ring list is a cable channel;
    determining, for each scanned virtual channel, which is a cable channel, whether that channel contains encrypted video or audio content;
    wherein those scanned channels determined not to have encrypted video or audio content are kept in the ring list and those scanned channels determined to have encrypted video or audio content are removed from the ring list; and
    generating a ring list used for tuning channels in channel up/down tuning operations,
    wherein the inclusion of a scanned channel in the ring list is based exclusively on whether the scanned signal contains encrypted video or audio content.

6. The non-transitory computer-readable medium according to claim 5, wherein
    the ring list is generated by adding a currently scanned virtual channel to the ring list and then subsequently deleting that channel from the ring list if the channel is determined to have encrypted video or audio content.

* * * * *